(12) United States Patent
Turvey (10) Patent No.: US 7,458,925 B2
(45) Date of Patent: Dec. 2, 2008

(54) METHOD OF AND APPARATUS FOR PRODUCING PLASTIC BAGS

(75) Inventor: Robert R. Turvey, County of Midland, MI (US)

(73) Assignee: S.C. Johnson Home Storage, Inc., Racine, WI (US)

( * ) Notice: Subject to any disclaimer, the term of this patent is extended or adjusted under 35 U.S.C. 154(b) by 1660 days.

(21) Appl. No.: 09/872,378

(22) Filed: Jun. 1, 2001

(65) Prior Publication Data

US 2002/0183183 A1    Dec. 5, 2002

(51) Int. Cl.
  *B31B 1/84*   (2006.01)
  *B65B 61/18*  (2006.01)
(52) U.S. Cl. .................... 493/213; 53/412; 53/133.4; 53/139.2
(58) Field of Classification Search .................... 53/412, 53/133.4, 139.2; 493/187, 213, 214, 927; 215/320; 206/459.5; 24/585.1, 585.12, 403, 24/399 X, 400 X; 383/37, 63, 64
See application file for complete search history.

(56) References Cited

U.S. PATENT DOCUMENTS

| | | | |
|---|---|---|---|
| 1,159,276 A | 11/1915 | Rose | |
| 1,887,324 A | 11/1932 | Pocoroba | |
| 3,795,082 A | 3/1974 | Brenner et al. .................. | 53/131 |
| 3,956,872 A | 5/1976 | Johnson ........................ | 53/131 |
| 4,632,667 A | 12/1986 | McDonald et al. ........... | 493/187 |
| 4,709,397 A * | 11/1987 | Voshall et al. .................. | 383/5 |
| 4,820,254 A | 4/1989 | Ziegelhoffer ................. | 493/194 |
| 4,972,657 A * | 11/1990 | McKee ....................... | 53/411 |
| 5,471,923 A | 12/1995 | Carroll et al. .................. | 101/32 |
| 5,479,853 A | 1/1996 | Carroll et al. .................. | 101/32 |
| 5,515,591 A | 5/1996 | Reynolds et al. ........... | 29/407.1 |
| 5,518,490 A | 5/1996 | Ziegelhoffer ................. | 493/193 |
| 5,715,943 A * | 2/1998 | Thompson, Jr. ............. | 206/363 |
| 5,783,012 A * | 7/1998 | Porchia et al. ................ | 156/66 |
| 5,818,719 A * | 10/1998 | Brandon et al. ............. | 700/125 |
| 5,956,924 A * | 9/1999 | Thieman ...................... | 53/412 |
| 6,052,967 A * | 4/2000 | Hambach .................... | 53/138.4 |
| 6,193,058 B1 * | 2/2001 | Yacko et al. ................. | 206/222 |
| 6,248,050 B1 * | 6/2001 | Boy ........................... | 493/213 |
| 6,442,804 B2 * | 9/2002 | Turvey et al. ................. | 24/399 |
| 6,488,410 B2 * | 12/2002 | Schneider ....................... | 383/5 |

OTHER PUBLICATIONS

Merriamwebster.com; hardcopy of Word Search: indicia; dated Oct. 6, 2003.*

* cited by examiner

*Primary Examiner*—Rinaldi I. Rada
*Assistant Examiner*—John Paradiso (57) ABSTRACT

A method of and apparatus for producing plastic bags are disclosed. A web of plastic is folded to form an elongate folded web having free ends and closer tape is secured to the free ends of the elongate folded web. End stops are formed in the closer tape at spaced locations thereof and an indicia is formed in the end stops. The elongate folded web is simultaneously severed and sealed at the spaced locations to produce individual bags.

36 Claims, 11 Drawing Sheets

METHOD OF AND APPARATUS FOR PRODUCING PLASTIC BAGS

TECHNICAL FIELD

The present invention relates generally to production methods and devices, and more particularly to a method of and apparatus for producing plastic bags.

BACKGROUND ART

Manufacturing methods and devices have been developed to produce plastic bags in economical fashion. Such production methods are often highly automated and are capable of producing bags in large commercial quantities.

One type of bag making method that has been in use manufactures plastic bags from an elongate web of plastic material and a closer tape. The web of plastic material is folded lengthwise to form a web of folded plastic having a pair of free ends. The closer tape is brought into position adjacent the elongate web such that depending flanges of the closer tape are placed in overlapping relationship with the free ends of the elongate web. The flanges are then welded to the free ends by applying heat thereto. After the closer tape is secured to the free ends of the elongate web, slider closure members are installed onto the closer tape. Thereafter, the closer tape is embossed at spaced locations thereof to produce end stops. The elongate web is then simultaneously severed and sealed at the spaced locations by a hot knife to form individual bags.

While the foregoing production method has been effective to economically produce plastic bags on a commercial scale, it has been found that some bags produced in this manner can leak at a location adjacent the end stops. Still further, as with any production process, there exists the possibility that one or more components of the production line may not work as intended, thereby leading to the production of faulty bags. In such an event, it may be difficult or impossible to identify the production line that produced the faulty bag.

SUMMARY OF THE INVENTION

In accordance with one aspect of the present invention, a method of producing plastic bags comprises the steps of folding a web of plastic to form an elongate folded web having free ends and securing closer tape to the free ends of the elongate folded web. End stops are formed in the closer tape at spaced locations thereof, wherein the step of forming the end stops includes the step of creating an indicia in each of the end stops. The elongate folded web is simultaneously severed and sealed at each of the spaced locations to produce individual bags.

In accordance with a further aspect of the present invention, a method of producing a plastic bag includes the steps of folding a web of plastic to form an elongate folded web having free ends and securing closer tape to the free ends of the elongate folded web. First and second end stops are formed in the closer tape at spaced locations thereof, wherein the step of forming the first and second end stops includes the steps of welding portions of the folded web together at first and second areas adjacent the first and second end stops, respectively, and creating an indicia in at least one of the first and second areas and the first and second end stops. The elongate folded web is simultaneously severed and sealed at each of the spaced locations to produce a bag.

In accordance with yet another aspect of the present invention, an improvement in an apparatus for producing plastic bags from an elongate web of folded plastic having closer tape secured to free ends of the elongate plastic web comprises apparatus that forms end stops in the closer tape at spaced locations thereof. The apparatus includes an insert carried by one of a pair of parts wherein the insert includes a surface that creates an indicia when each end stop is formed.

In accordance with yet another aspect of the present invention, apparatus for producing plastic bags from an elongate folded web of plastic having closer tape secured to free ends of the elongate folded web includes means for forming end stops in the closer tape wherein the forming means includes means for creating an indicia in one of the closer tape and the folded web of plastic. Means are also provided for separating and sealing the elongate folded web at spaced locations thereof to produce individual bags.

According to still another aspect of the present invention, apparatus for producing plastic bags from an elongate folded web of plastic having closer tape secured to free ends of the elongate folded web includes an ultrasonic welding device operable to form end stops in the closer tape wherein the ultrasonic welding device includes at least one removable button that creates an indicia. A hot knife separates and seals the elongate folded web at spaced locations thereof to produce individual bags.

Other aspects and advantages of the present invention will become apparent upon consideration of the following detailed description.

DESCRIPTION OF THE PREFERRED EMBODIMENTS

Figure 1:
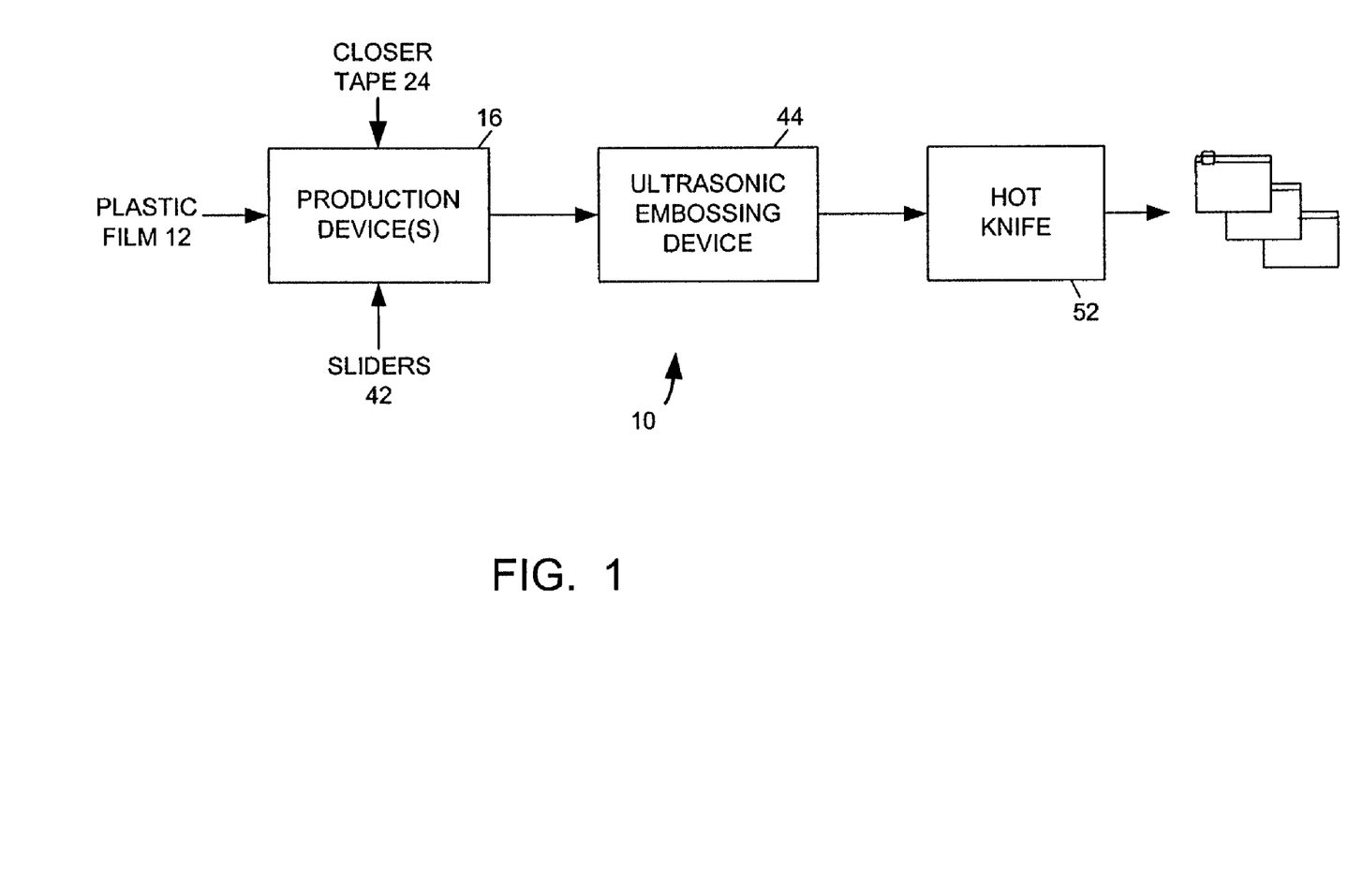
FIG. 1 comprises a block diagram of an apparatus for producing plastic bags.
Figure 7:
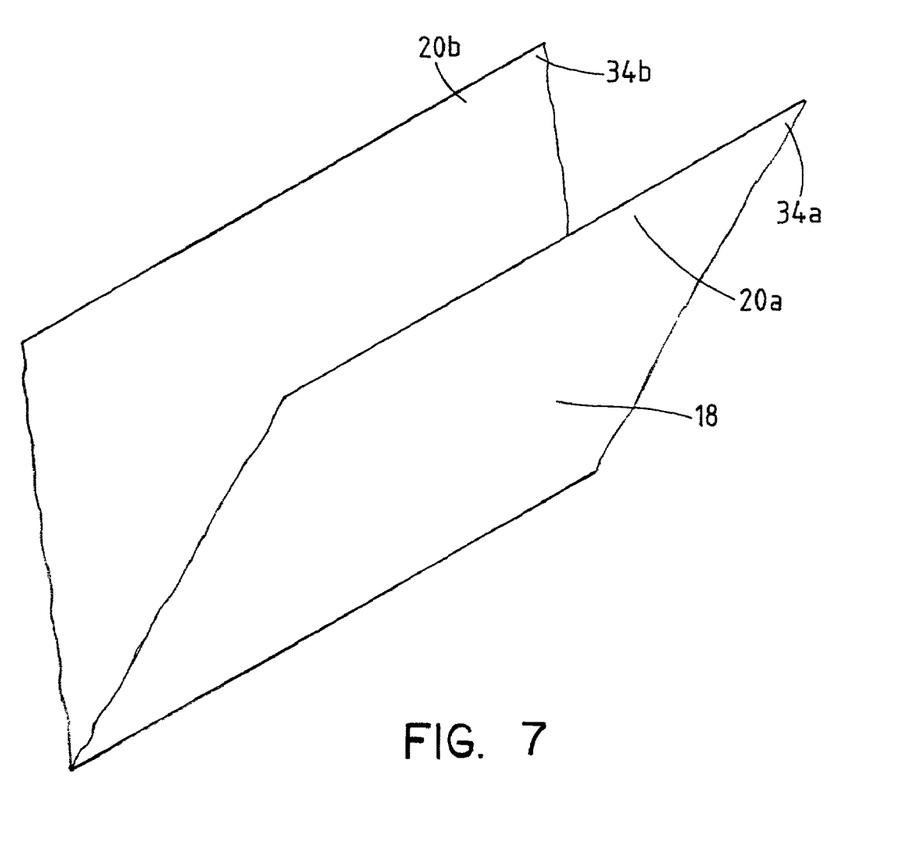
FIG. 7 comprises a fragmentary isometric view of the elongate folded web before application of the slider tape thereto.

Referring first to FIG. 1, an apparatus 10 for producing plastic bags is illustrated. An elongate web of thermoplastic material or film 12 is provided to one or more production devices 16. Referring also to FIG. 7, the thermoplastic film 12 is formed into an elongate folded web 18 having free ends 20a, 20b.

Figure 8:
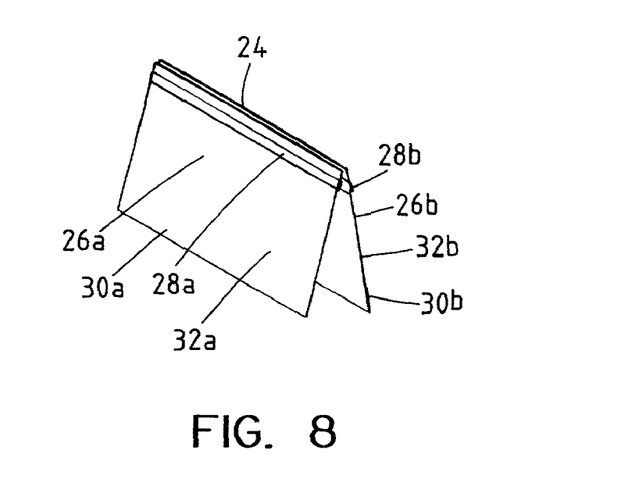
FIG. 8 comprises a fragmentary isometric view of the closer tape.

As seen in FIGS. 1 and 8, the production device(s) further receive closer tape 24 having portions 26a, 26b which may be joined together by closer elements 28a, 28b. The portions 26a, 26b include downwardly depending flanges 30a, 30b, respectively.

Figure 9:
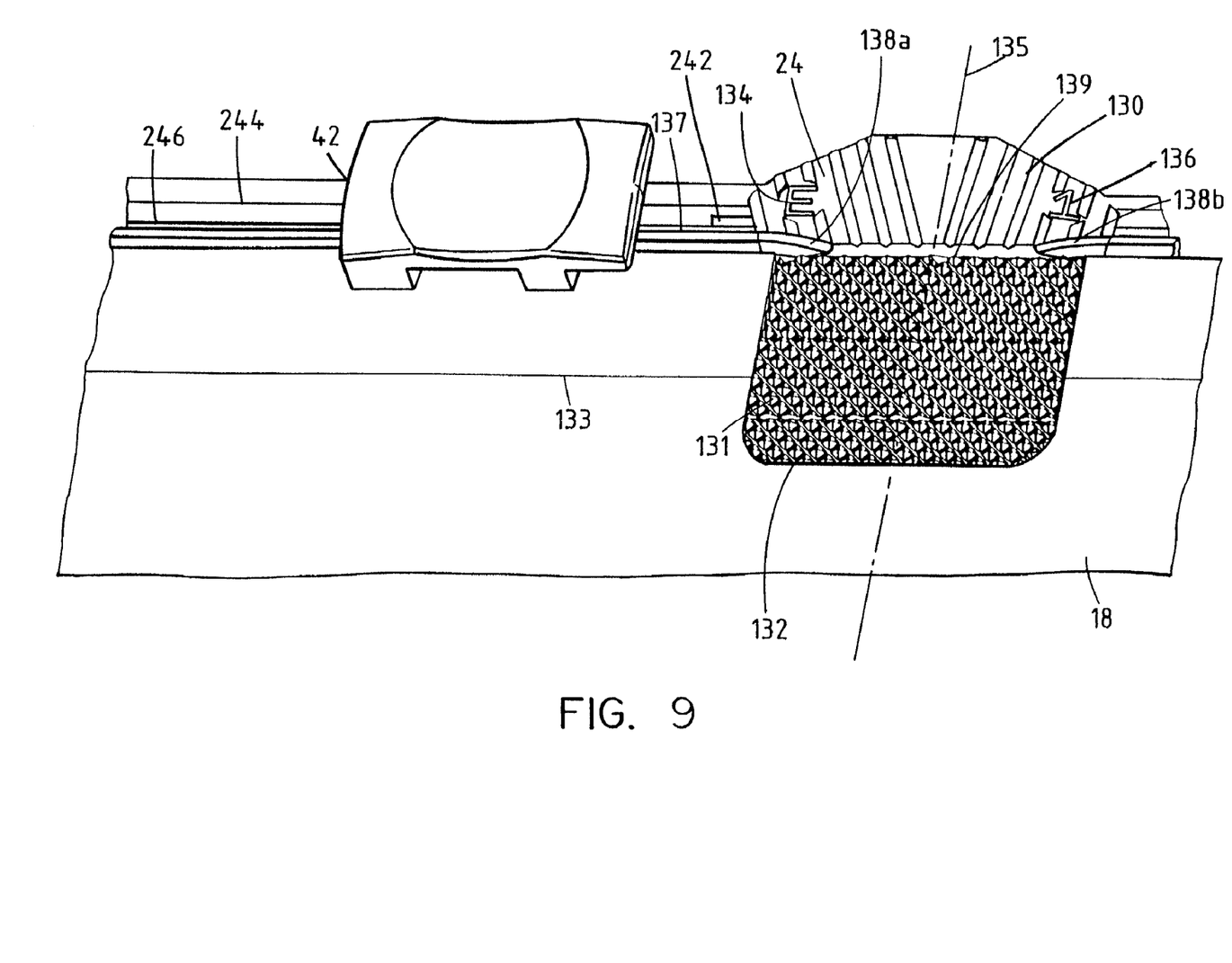
FIG. 9 is a fragmentary, enlarged, isometric view of the elongate folded web after application of the closer tape and slider thereto and after formation of end stops therein.
Figure 10:
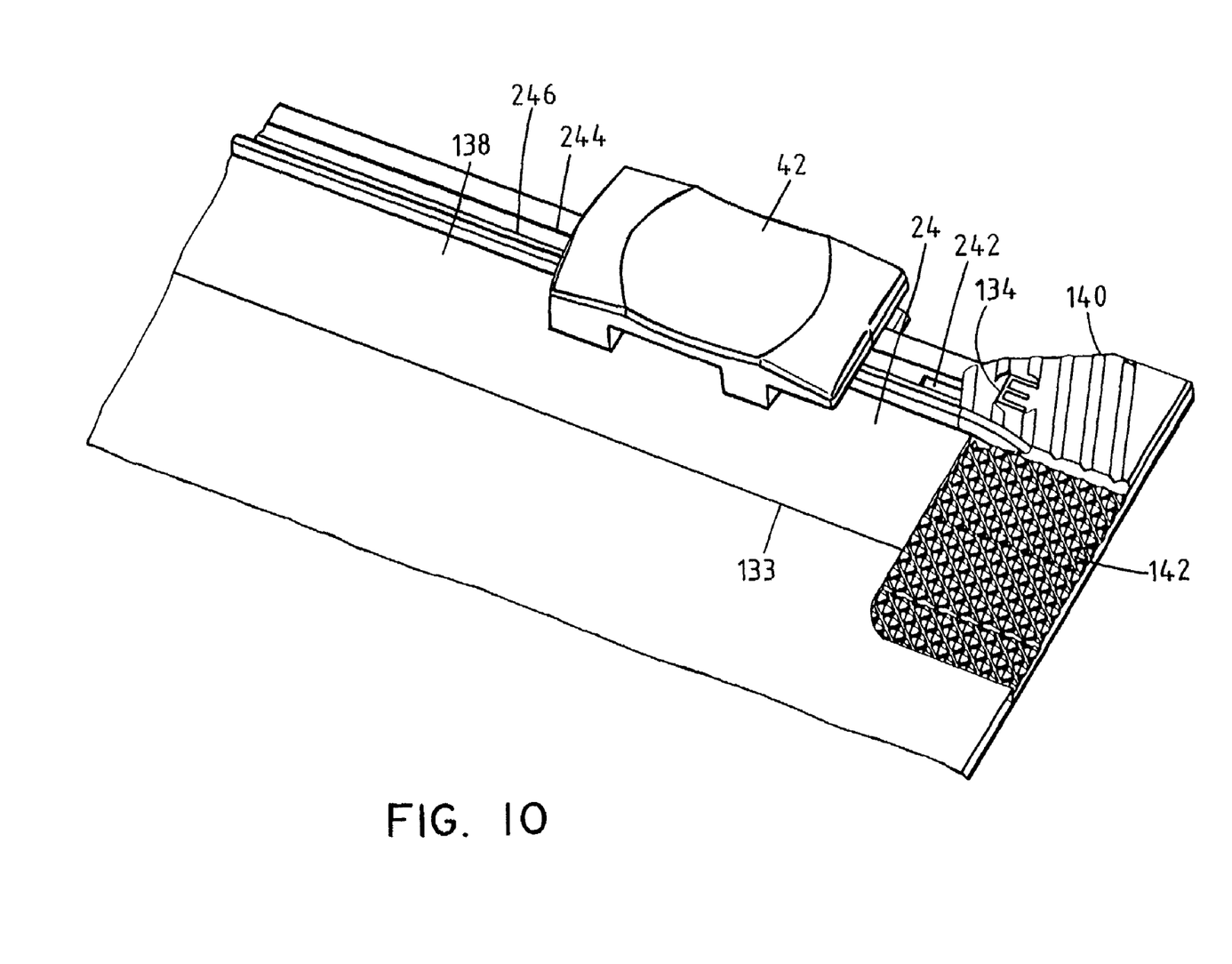
FIG. 10 is a view similar to FIG. 9 illustrating a finished bag.
Figure 11:
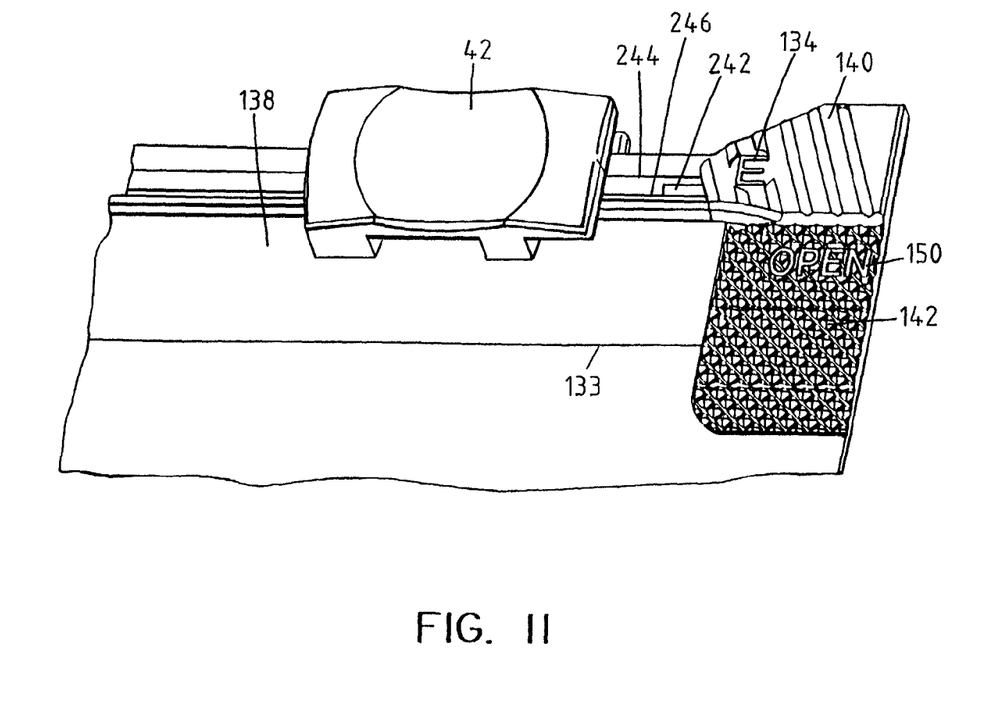
FIG. 11 is a view similar to FIG. 10 illustrating an alternative embodiment of a bag produced in accordance with the present invention.

Referring again to FIG. 1, the production device(s) 16 also optionally receive a plurality of slider closure members 42, one of which is illustrated in FIGS. 9-11. The production device(s) 16 secure the flanges 30a, 30b of the closer tape 24 to the free ends 20a, 20b of the web 18 and optionally apply the slider closure members 42 to the closer tape. The elongate folded web 18 with closer tape 24 and optional sliders 42 are delivered to an ultrasonic embossing device 44 that creates end stops therein. After the end stops are formed, a hot knife 52 simultaneously severs and seals the elongate web 18 at spaced locations thereof to create individual bags.

Figure 2:
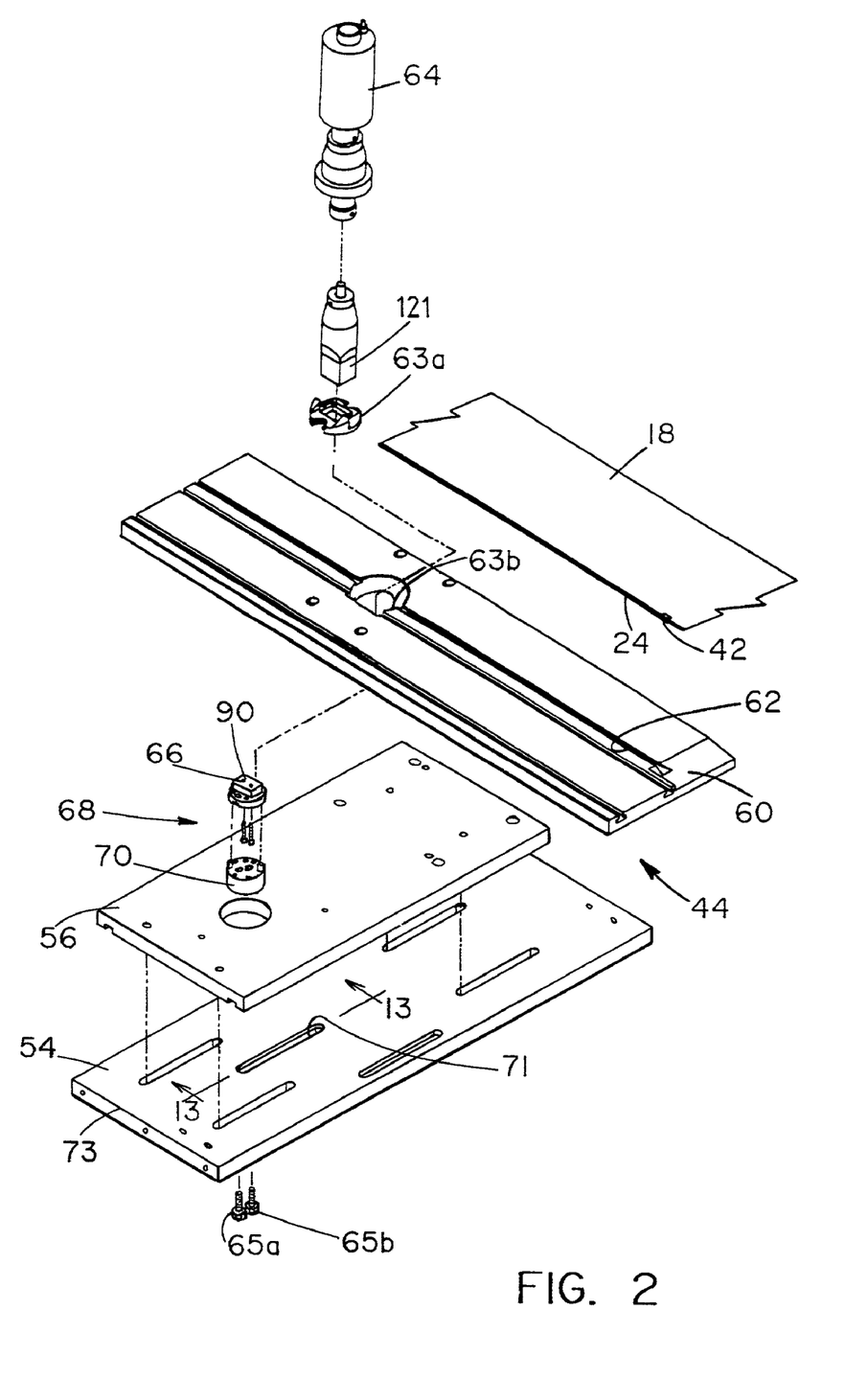
FIG. 2 comprises an isometric view of a portion of the ultrasonic embossing device of FIG. 1.
Figure 2A:
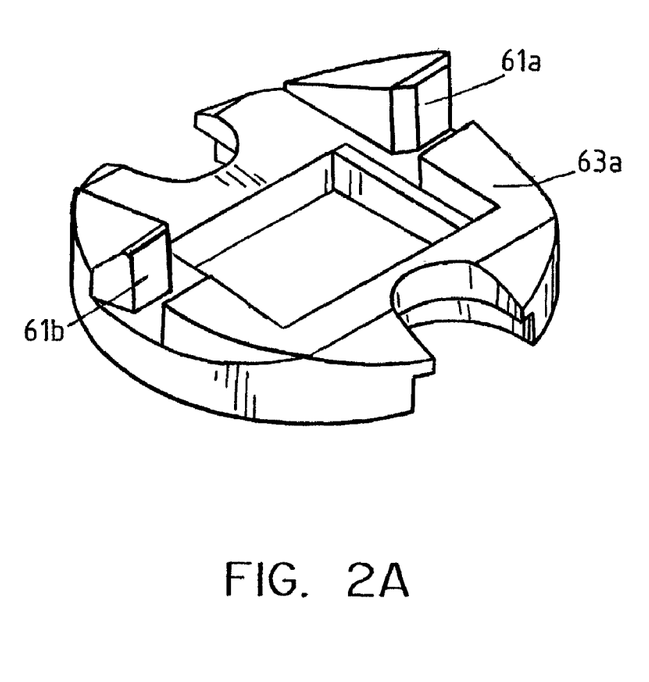
FIG. 2A comprises an isometric view of the slider ramp ring of FIG. 2.

Referring now to FIG. 2, the ultrasonic embossing device 44 includes a frame member 54, a mounting plate 56 and a slider table 60 having a longitudinal slot 62 therein. The member 54, the mounting plate 56 and the slider table 60 are secured together in any suitable fashion, such as by bolts or screws or any other fasteners. The sliders 42 mounted on the elongate web 18 slide within the slot 62 during travel of the web 18, thereby guiding the web 18 on the slider table 60. Further, as also seen in FIG. 2A, guiding is additionally obtained by engagement of the free ends 20a, 20b with upstanding guide surfaces 61a, 61b of a slider ramp ring 63a carried in a recess 63b of the slider table 60. During operation, the web 18 is periodically advanced and stopped and an ultrasonic horn assembly 64 is brought down into contact with the closer tape 24 and, optionally, areas of the free ends 20a, 20b, thereby capturing the closer tape 24 (and the areas of the free ends 20a, 20b, if contacted by the assembly 64) between the ultrasonic horn assembly 64 and an anvil 66. The ultrasonic horn assembly 64 is then operated to emboss portions of the closer tape 24 and, optionally, the material of the web 18.

Figure 3:
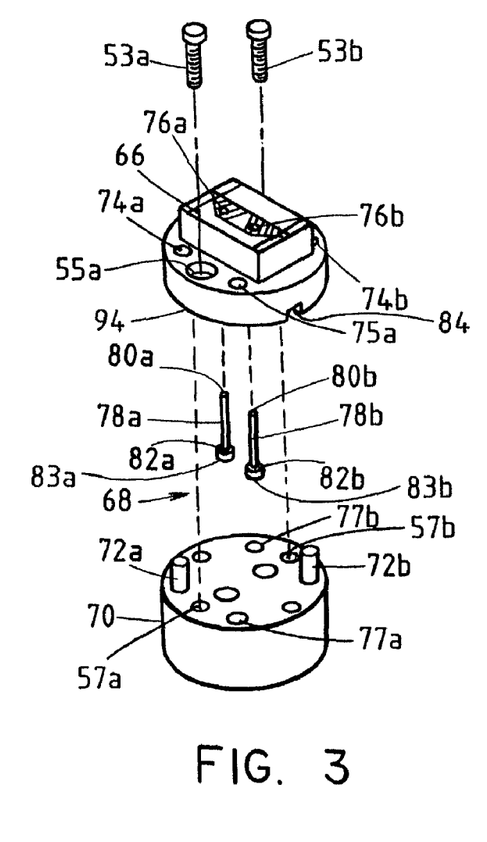
FIG. 3 comprises an exploded isometric view of a portion of the anvil of FIG. 2.
Figure 4:
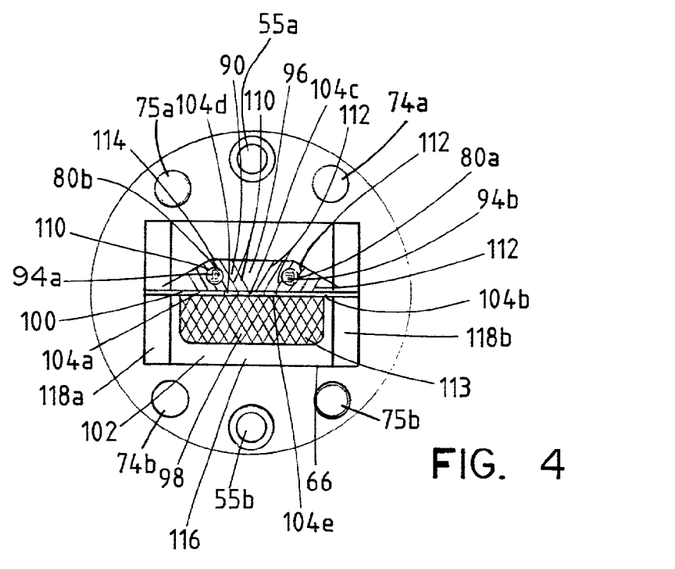
FIG. 4 comprises a plan view of the anvil of FIG. 2.
Figure 5:
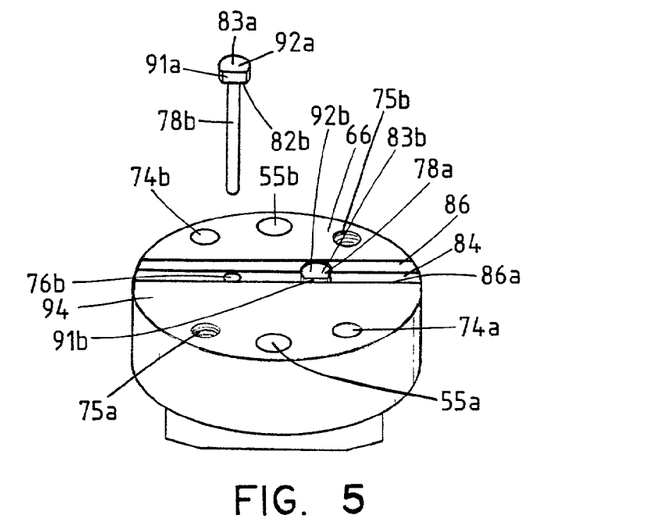
FIG. 5 comprises an exploded isometric view of the bottom of the anvil of FIG. 2.

Referring to FIGS. 3-5, the anvil 66 comprises a portion of an anvil assembly 68 which, as seen specifically in FIG. 3, includes a holder 70 having a pair of upstanding posts 72a, 72b that fit within bores 74a, 74b, respectively, in the anvil 66. Fasteners 53a, 53b, such as screws or bolts, extend through countersunk through bores 55a, 55b and into threaded bores 57a, 57b, respectively, in the holder 70 to secure the anvil 66 to the holder 70. Referring to FIGS. 2-5, the anvil 66 further includes a pair of bores 76a, 76b extending fully therethrough having first and second removable buttons 78a, 78b, respectively, disposed tightly therein and retained by a press fit. The buttons 78a, 78b include upper surfaces 80a, 80b, respectively. When the buttons 78a, 78b are fully installed into the bores 76a, 76b, such that surfaces 82a, 82b of heads 83a, 83b abut a base surface 84 of a groove 86, the surfaces 80a, 80b are substantially flush with an upper surface 90 of the anvil 66. The heads 83a, 83b include flats 91a, 91b that prevent rotation of the buttons 78a, 78b due to engagement of the flats 91a, 91b with a side wall 86a defining the groove 86. The heads 83a, 83b further include outer surfaces 92a, 92b that are flush with a rear surface 94 of the anvil 66 when the buttons 78a, 78b are fully installed in the bores 76a, 76b as noted above. Therefore, when the anvil 66 is mounted on the holder 70, the buttons 78a, 78b are firmly captured so that axial movement thereof relative to the anvil is prevented. As seen specifically in FIG. 4, the surfaces 80a, 80b include recessed portions 94a, 94b which produce indicia in the formed end stops as noted in greater detail hereinafter.

Figure 13:
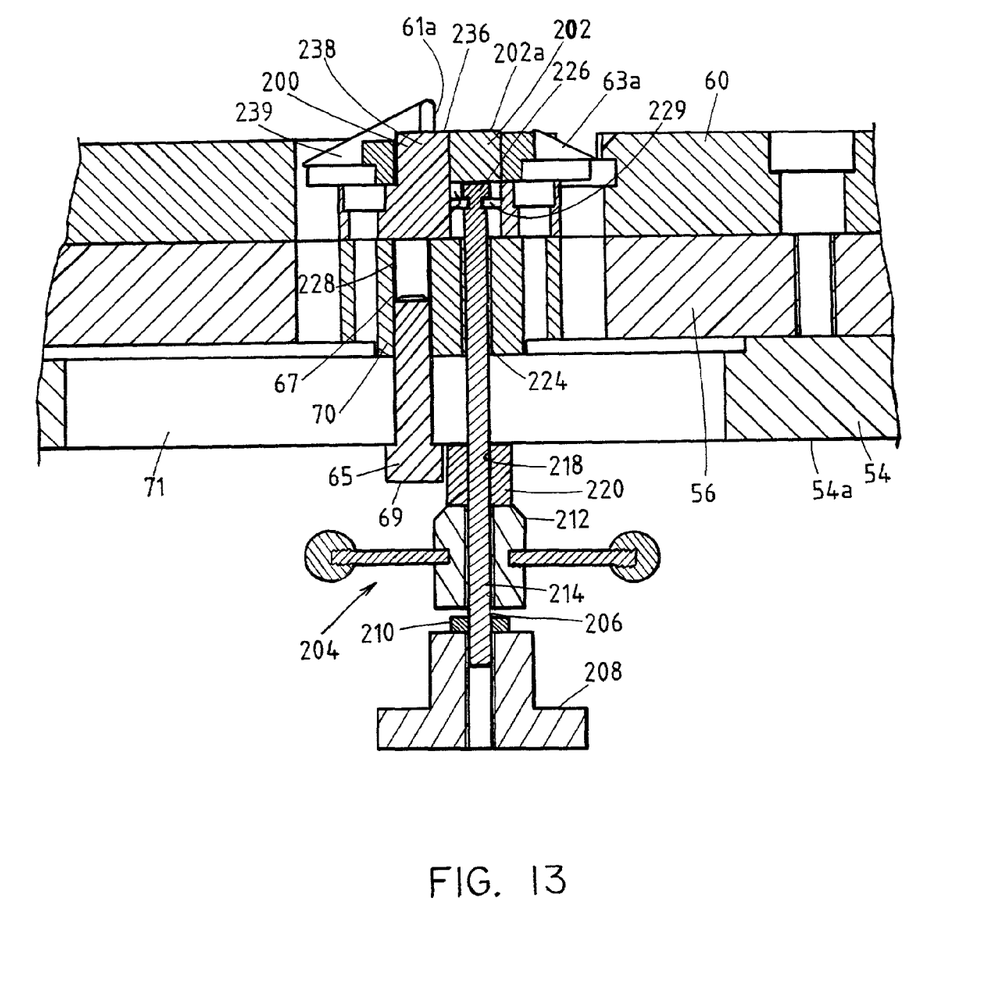
FIG. 13 is a sectional view taken generally along lines 13-13 of FIG. 2 illustrating a further embodiment of the present invention.

Referring also to FIG. 13 (which illustrates an alternate embodiment, but which is identical to the present embodiment insofar as the mounting of the holder 70 is concerned), the holder 70 is secured to the slider table 60 by a bolt 65 that extends into a threaded bore 67 in the holder 70. The bolt 65 extends through a slot 71 in the member 54 and includes an enlarged head 69 that engages a bottom surface 54a of the member 54 (FIG. 2). A pair of threaded bores 75a, 75b (FIG. 5) are provided, each of which is aligned with an associated threaded bore 77a, 77b, respectively (FIG. 3) in the holder 70. Each of the aligned threaded bores 75a, 77a and 75b, 77c can receive a jack screw (not shown) that can be advanced into the bores 75, 77 to separate the anvil 66 from the holder 70 when maintenance and/or cleaning is required or desired.

Referring specifically to FIG. 4, the anvil 66 further includes a first textured surface 96 and a second textured surface 98 separated from one another by a slot 100 that extends from side-to-side across a face 102 of the anvil 66. The slot 100 is, in part, defined by side floor portions 104a, 104b that are substantially coplanar (i.e., the portions 104a and 104 are disposed at substantially equal constant depths). The slot 100 is further defined by a central portion 104c that is elevated above the side portions 104a, 104b and which is joined to the side portions 104a, 104b by curved transition portions 104d, 104e.

As seen in FIG. 4, the first textured surface 96 includes a first set of diagonal channels 110 and a second set of diagonal channels 112 wherein the first and second sets of channels 110, 112 slant in opposite directions. The second textured surface 98 includes cross-hatched channels that form a knurled pattern in the finished bag as noted in greater detail hereinafter. As should be evident from an inspection of FIG. 4, the first textured surface 96 includes an outer periphery 114 wherein the button surfaces 94a, 94b are disposed within such periphery.

Figure 12:
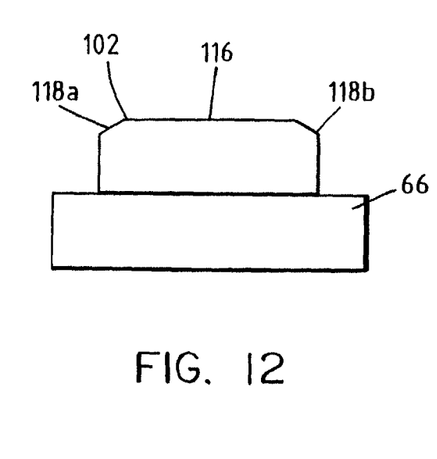
FIG. 12 is a side elevational view of the anvil of FIG. 2.

Referring also to FIG. 12, the face 102 of the anvil 66 is defined by a central section 116 and inclined side sections 118a, 118b. Although not visible in the FIGS., the central section 116 is slightly rounded in convex fashion for the purpose noted hereinafter.

Figure 6:
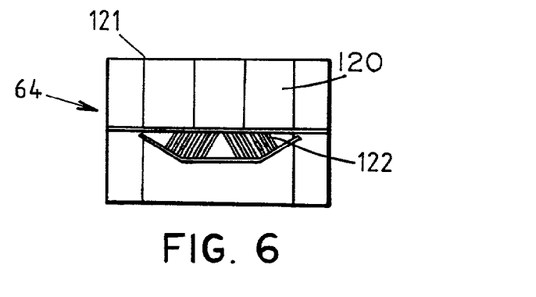
FIG. 6 comprises a bottom elevational view of the ultrasonic horn of FIG. 2.

FIG. 6 illustrates an end surface 120 of a horn 121 forming a part of the ultrasonic horn assembly 64. The end surface 120 includes a textured surface 122 substantially identical to and aligned with the first textured surface 96 (i.e., the textured surfaces 96 and 122 are substantially mirror images of one another) when the ultrasonic horn assembly 64 is brought down into contact with the closer tape 24.

FIG. 9 illustrates a portion of the elongate web 18 and closer tape 24 after embossing by the ultrasonic horn assembly 64. An enlarged body 130 is formed in the closer tape 24 together with a knurled portion 132. The knurled portion 132 may extend into the free ends of the web 18, as illustrated by the portion 131 below a bottom edge 133 of the closer tape 24. Alternatively, the knurled portion may not extend into the web 18, if desired. At least one, and preferably, first and second indicia 134, 136 are formed in the enlarged body 130 and/or the knurled portion 132. These indicia may represent, for example, the production line on which the bag was produced and a date code indicating the year in which the bag was produced. Alternatively, other indicia may be provided indicating other types of information, as desired. Also during the embossing process, a rail 137 is received in the slot 100. The transition portions 104d, 104e and the central portions 104c deform the rail 137 to create curved rail ends 138a, 138b and an interrupted portion 139.

As seen in FIG. 10, after simultaneous severing and sealing by the hot knife 52 at a position substantially coincident with a line 135 (FIG. 9), a resulting bag 138 includes an end stop 140 having the indicia 134 embossed therein and a knurled area 142 adjacent the end stop 140 wherein the knurled area 142 is disposed in the closer tape 24 and, if desired, the material forming the walls of the bag. Substantially identical, mirror-image features are provided at the opposite end of the bag. The knurled patterns reduce the incidence of leaks at such areas. In addition, the slightly rounded central section 116 noted above in connection with FIG. 12 results in knurled patterns and end stops having profiled portions that are of lesser depth toward the centers of the bags as opposed to the extreme outer edges of the bags.

The end stop 140 provides a surface for preventing movement of the slider 42 beyond a certain point and presents a substantial obstacle to removal thereof.

As seen in FIG. 11, one or more indicia may alternatively, or in addition, be provided in the area 142, for example, as shown at 150 formed by one or more structures and/or surfaces carried by the anvil 66. These indicia may be of the types described above or may be indicia indicating other types of information as desired. For example, a word indicating whether the bag is opened or closed when the slider 42 is disposed at such position may be provided at the location 142 and the corresponding location on the opposite side of the bag.

Because the buttons 78a, 78b are removable from the bores 76a, 76b, the buttons can be replaced by other buttons to permit other indicia to be embossed into the bag. Also, because the buttons 78a, 78b must not vibrate inside the anvil 66 during embossing, a tight fit must be provided between the buttons 78a, 78b and the walls forming the bores 76a, 76b.

If desired, the indicia 134, 136 and/or 150 could be formed by one or more raised surfaces of the buttons 78a, 78b rather than the recessed portions 94a, 94b. Still further, the indicia 134, 136 and/or 150 may be formed by one or more structures and/or surfaces carried by or forming a part of the horn assembly 64, rather than the anvil 66. In addition, if there is no need to change the indicia, the buttons could be made non-replaceable or the indicia could be embossed by surfaces of the anvil 66 proper.

FIG. 13 illustrates an alternative embodiment of the present invention wherein elements common throughout the preceding figures are given like reference numerals. In the embodiment of FIG. 13, the anvil 66 of the previous figures is replaced by an anvil 200 having a movable portion or member 202 which may be translated up and down (as seen in FIG. 13) by adjustment apparatus 204. The adjustment apparatus 204 includes a threaded rod 206, a knob 208 threaded onto the threaded rod 206 and maintained in a predetermined position by a stop nut 210 and a handle collar 212 having a threaded bore 214 extending longitudinally therethrough. The threaded rod 206 is threaded into the bore 214 and the rod 206 extends through a smooth bore 218 in a bushing 220. The bushing 220 is captured between the handle collar 212 and a bottom surface of the frame member 54 discussed above.

The threaded rod 206 further extends upward through a threaded bore 224 in the holder 70 and terminates at an enlarged T-shaped head 226 that is captured in a T-shaped slot 228 partially defined by two flanges 229 carried by the movable members 202 (only one of the flanges 229 is visible in FIG. 13).

Figure 14:
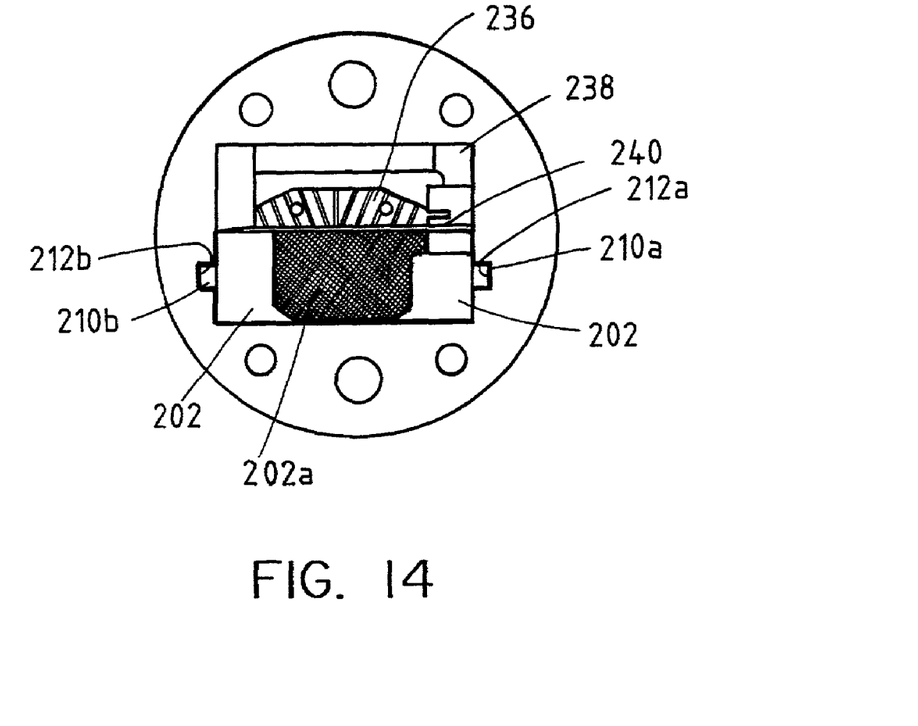
FIG. 14 is a plan view of the embodiment of FIG. 13.
Figure 15:
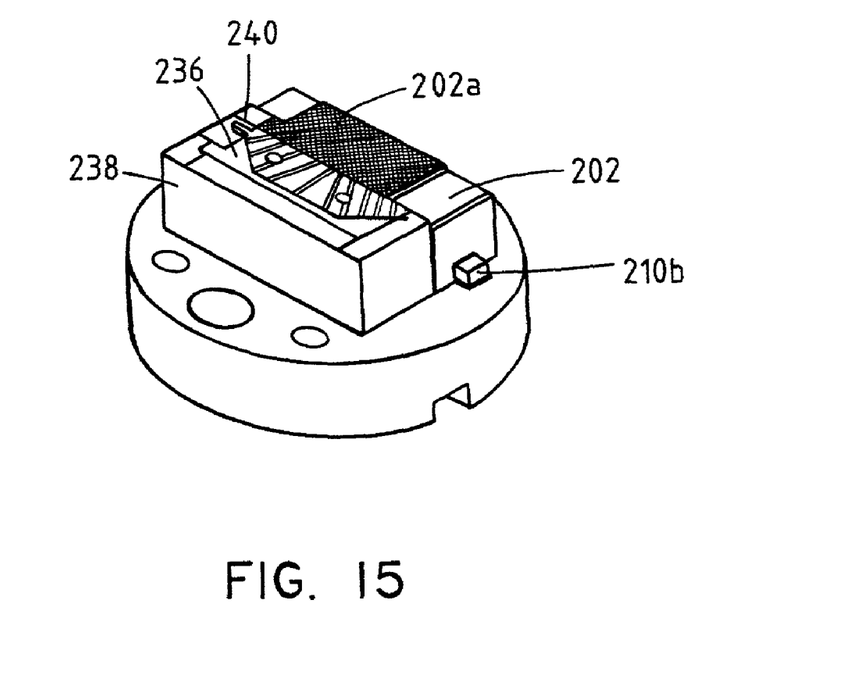
FIG. 15 is an isometric view of the embodiment of FIG. 13.

Referring also to FIGS. 14 and 15, the movable portion 202 includes ribs 210a, 210b which are disposed in correspondingly-shaped channels 212a, 212b. The ribs 210a, 210b are guided within the channels 212a, 212b, respectively, to allow up and down translation of the movable member 202 relative to the remainder of the anvil 200. The position of the movable member 202 relative to the remainder of the anvil 200 is controlled by rotating the knob 208, thereby rotating the threaded rod 206. Specifically, when it is desired to adjust the position of the movable member 202, the handle collar 212 is rotated to retract the collar 212 and the bushing 220 from the bottom surface 54a. The knob 208 can then be rotated to adjust the height of an upper surface 202a of the movable portion 202. The collar may then be counter-rotated to advance the collar 212 and the bushing 220 against the lower surface 54a to lock the various parts against further movement.

In the preferred embodiment, the movable member 202 is dimensioned such that when a lower surface 230 of the member 202 is in contact with an upper surface 232 of the holder 70, the upper surface 202a of the movable member 202 is disposed a predetermined distance below an upper surface 236 of a stationary member 238. In addition, the ribs 210a, 210b are positioned and dimensioned such that the movable member 202 is movable upward by a further predetermined distance in part determined by the length of channels 238a, 238b formed in a slider ramp ring 239. (The slider ramp ring 239 is, with the exception of the channels 238a, 238b, identical to the slider ramp ring 63a described above.) The length of travel afforded to the movable member 202 permits the position of the upper surface 202a to be adjusted relative to the position of the upper surface 236. This, in turn, allows adjustment of the forces applied to the enlarged body 130 relative to the knurled portion 132. Thus, for example, relatively lesser forces may be applied to the enlarged body 130 during the end stop formation process as compared to the forces applied to the knurled portion 132 during such process or the forces applied to the enlarged body 130 may be greater than the forces applied to the knurled portion 132. In this manner, the shapes and thicknesses of the resulting portions 130 and 132 can be adjusted relative to one another so that adequate sealing is accomplished at the knurled portion 132 and an enlarged body 130 of a desired shape to achieve high pull-off resistance of the slider 42 is obtained.

Figure 16:
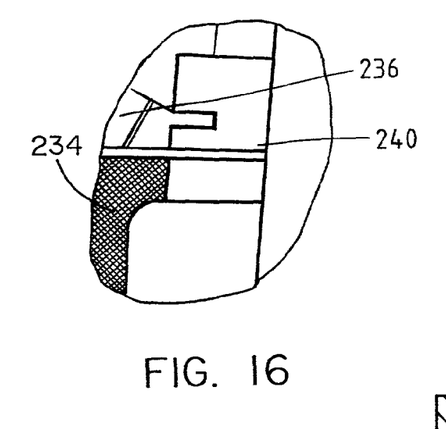
FIG. 16 is a fragmentary, enlarged plan view of a portion of the embodiment of FIGS. 14 and 15.

Referring specifically to FIGS. 14-16, the upper surface 236 may be provided with an extension portion 240 disposed at substantially the same height as the remainder of the upper surface 236. The extension portion 240 forms a sealed bag portion 242 as illustrated in FIGS. 9-11 where the layers of thermoplastic are joined together. The sealed portion 242 may be disposed between an upper closer profile 244 and a lower closer profile 246. Alternatively, the sealed portion 242 may intersect the lower closer profile 246. The position of the sealed portion 242 is accurately controlled by the guiding afforded by the contact of the closer tape 24 with the guide surfaces 61a, 61b of the slider ramp ring 239. In any event, the sealed portion 242 prevents opening of both of the closer profiles 244 and 246 when the closer 42 is located at the extreme righthand position on the bag as seen in FIGS. 9-11. The sealed portion 242 thus prevents leakage of contents from the bag when the closer 42 is in the fully closed position.

Figure 17:
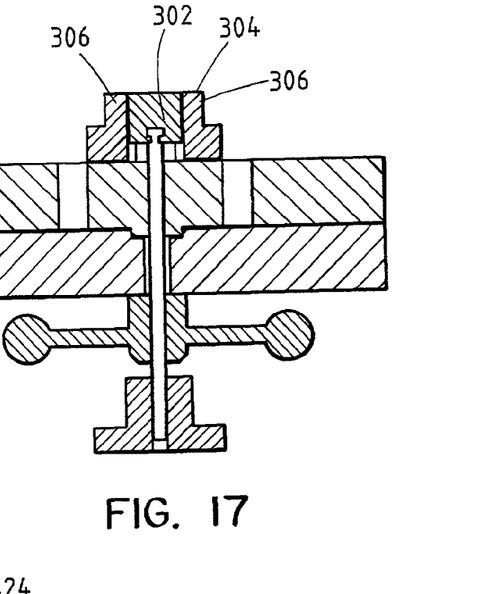
FIG. 17 is a sectional view of yet another embodiment of the present invention.

FIG. 17 illustrates an alternative embodiment wherein a movable portion 302 of an anvil 304 is disposed between or among two or more stationary portions 306 of the anvil 304.

Figure 18:
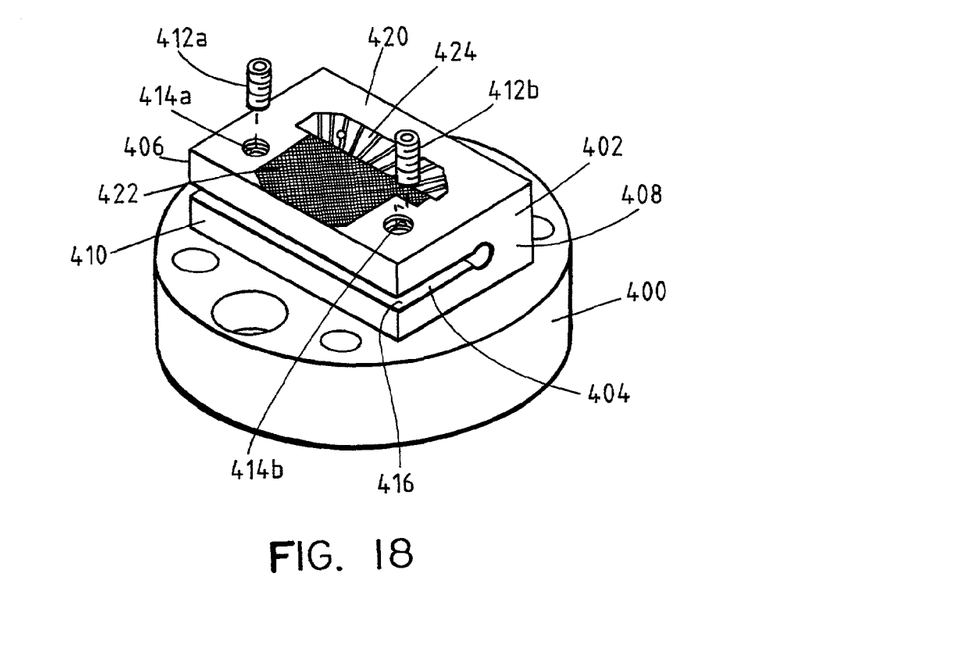
FIG. 18 is an isometric view of still another embodiment of the present invention.

Referring next to FIG. 18, yet another embodiment is illustrated wherein an anvil 400 includes an upper portion 402 having a slot 404 formed therein. The slot 404 permits a portion 406 to be moved about a hinge portion 408 relative to a stationary portion 410. Such movement may be effected by threading one or more alien screws 412a, 412b into one or more threaded bores 414a, 414b, respectively, until lower surfaces of the allen screws 412a, 412b contact a surface 416 of the lower portion 410. Continued advancement of the screws 412a, 412b in the bores 414a, 414b, respectively, leads to displacement of the upper portion 406 relative to the portion 410. In this manner, an upper surface 420 can be deformed from a planar shape to a curved shape to cause movement of a first textured portion 422 relative to a second textured portion 424. In this fashion, the forces exerted on the elongate web of thermoplastic material during formation of end stops can be differentially developed by the portions 422 and 424 to obtain desired deformations of portions of the plastic web contacted by such portion in a fashion similar to the embodiment of FIGS. 13-16.

It should be noted that further alternative embodiments of the present invention could be envisioned. For example, rather than having the anvil be stationary and the horn be movable into contact with the plastic web, the horn may instead be made stationary and the anvil may be made movable into contact with the web of thermoplastic material to form the end stops. In this case, the anvil may be of a single piece design or may have relatively movable portions as described above.

INDUSTRIAL APPLICABILITY

The present invention permits plastic bags to be encoded with information that, for example, identifies the production line that produced the bag and/or the date on which the bag was produced. Such information is useful to isolate the production line that produced one or more faulty bags. In addition, improved sealing at and adjacent to the end stops is obtained and slider pull-off force is desirably increased.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. A method of producing plastic bags, the method comprising the steps of:
   folding a web of plastic to form an elongate folded web having free ends;
   securing closer tape to the free ends of the elongate folded web;
   forming end stops in the closer tape at spaced locations thereof, such step including the step of creating an indicia in each of the end stops, wherein the indicia designates at least one of a production line that produced the plastic bags and a time at which the bags were produced; and
   simultaneously severing and sealing the elongate folded web at each of the spaced locations to produce individual bags.

2. The method of claim 1, wherein the step of forming end stops comprises the step of ultrasonically embossing a pattern into the closer tape.

3. The method of claim 2, wherein the step of ultrasonically embossing includes the step of moving a weld horn toward an anvil wherein the zipper tape is captured between the weld horn and the anvil.

4. The method of claim 3, wherein the pattern is formed by a textured surface of the anvil.

5. The method of claim 3, wherein the pattern is formed by a textured surface of a horn.

6. The method of claim 3, wherein the indicia is formed by a button removable received in a bore in the anvil.

7. The method of claim 6, wherein the indicia designates the production line that produced the plastic bags.

8. The method of claim 7, wherein the indicia designates the time at which the bags were produced.

9. The method of claim 1, wherein the step of forming the end stops comprises the step of embossing first and second different indicia on opposite sides of each of a plurality of bag end locations and wherein the step of simultaneously severing and sealing comprises the step of severing and sealing the elongate folded web at positions substantially coincident with each of the bag end locations.

10. The method of claim 9, wherein the first indicia designates the production line that produced the plastic bags.

11. The method of claim 10, wherein the second indicia designates the time at which the bags were produced.

12. The method of claim 1, including the further step of slidably attaching a slider to the closer tape.

13. The method of claim 1, further including the step of forming a knurled pattern in the web of plastic at a point adjacent the end stop.

14. The method of claim 13, wherein the knurled pattern is formed by a movable portion of the anvil.

15. The method of claim 14, wherein the movable portion is moved by a threaded rod.

16. The method of claim 14, wherein the movable portion is movable by at least one screw disposed in a threaded bore.

17. The method of claim 1, including the step of forming a sealed portion in the closer tape adjacent to a closer profile.

18. The method of claim 17, wherein the step of forming a sealed portion includes the step of guiding the closer tape using an at least one upstanding surface.

19. A method of producing a plastic bag, the method comprising the steps of:
   folding a web of plastic to form an elongate folded web having free ends;
   securing closer tape to the free ends of the elongate folded web;
   forming first and second end stops in the closer tape at spaced locations thereof, such step including the steps of welding portions of at least one of the closer tape and the folded web together at first and second areas adjacent the first and second end stops, respectively, and creating an indicia in at least one of the first and second areas and the first and second end stops, wherein the indicia designates at least one of a production line that produced the plastic bags and a time at which the bags were produced; and
   simultaneously severing and sealing the elongate folded web at each of the spaced locations to produce a bag.

20. The method of claim 19, wherein the step of forming the first and second end stops comprises the step of ultrasonically embossing a pattern into the closer tape.

21. The method of claim 20, wherein the step of ultrasonically embossing includes the step of moving a weld horn toward an anvil wherein the zipper tape is captured between the weld horn and the anvil.

22. The method of claim 21, wherein the pattern is formed by a textured surface of the anvil.

23. The method of claim 21, wherein the pattern is formed by a textured surface of a horn.

24. The method of claim 21, wherein the indicia is formed by a button removable received in a bore in the anvil.

25. The method of claim 24, wherein the indicia designates the production line that produced the plastic bags.

26. The method of claim 24, wherein the indicia designates the time at which the bags were produced.

27. The method of claim 19, wherein the step of forming the first and second end stops comprises the step of embossing first and second different indicia on opposite sides of each of first and second bag end locations and wherein the step of simultaneously severing and sealing comprises the step of severing and sealing the elongate folded web at positions substantially coincident with each of the first and second bag end locations.

28. The method of claim 27, wherein the first indicia designates the production line that produced the plastic bags.

29. The method of claim 28, wherein the second indicia designates the time at which the bags were produced.

30. The method of claim 19, including the further step of slidably attaching a slider to the closer tape.

31. The method of claim 19, wherein the first and second areas include a knurled pattern in the web of plastic.

32. The method of claim 31, wherein the knurled pattern is formed by a movable portion of the anvil.

33. The method of claim 32, wherein the movable portion is moved by a threaded rod.

34. The method of claim 33, wherein the movable portion is movable by at least one screw disposed in a threaded bore.

35. The method of claim 19, including the step of forming a sealed portion in the closer tape adjacent to a closer profile.

36. The method of claim 35, wherein the step of forming a sealed portion includes the step of guiding the closer tape using an at least one upstanding portion of a slider ring.

* * * * *